US007567984B1

(12) United States Patent
Todd

(10) Patent No.: US 7,567,984 B1
(45) Date of Patent: Jul. 28, 2009

(54) OPERATING SYSTEM AND APPLICATION DEPLOYMENT BASED ON STORED USER STATE AND ORGANIZATIONAL POLICY

(75) Inventor: Xan Todd, Auckland (NZ)

(73) Assignee: Symantec Operating Corporation, Mountain View, CA (US)

(*) Notice: Subject to any disclaimer, the term of this patent is extended or adjusted under 35 U.S.C. 154(b) by 236 days.

(21) Appl. No.: 11/515,149

(22) Filed: Aug. 31, 2006

(51) Int. Cl.
G06F 17/00 (2006.01)
G06F 9/445 (2006.01)

(52) U.S. Cl. .............. 707/104.1; 717/174; 717/175; 717/176; 717/177; 713/1; 713/100; 709/220; 709/222

(58) Field of Classification Search ........... 707/104.1; 717/174–178; 713/1, 100; 709/220, 222
See application file for complete search history.

(56) References Cited

U.S. PATENT DOCUMENTS

| | | | | |
|---|---|---|---|---|
| 5,247,683 A * | 9/1993 | Holmes et al. | ............... | 709/221 |
| 5,555,416 A * | 9/1996 | Owens et al. | ............... | 717/178 |
| 5,581,764 A * | 12/1996 | Fitzgerald et al. | ........... | 709/223 |
| 5,671,412 A * | 9/1997 | Christiano | ............... | 707/104.1 |
| 5,745,879 A * | 4/1998 | Wyman | ......................... | 705/1 |
| 5,963,207 A * | 10/1999 | Brewer et al. | ............... | 715/810 |
| 6,389,589 B1 * | 5/2002 | Mishra et al. | ............... | 717/170 |
| 6,418,554 B1 * | 7/2002 | Delo et al. | .................. | 717/174 |
| 6,496,979 B1 * | 12/2002 | Chen et al. | .................. | 717/178 |
| 6,697,852 B1 * | 2/2004 | Ryu | ........................... | 709/220 |
| 6,754,896 B2 * | 6/2004 | Mishra et al. | ............... | 717/176 |
| 6,973,647 B2 * | 12/2005 | Crudele et al. | ............. | 717/177 |
| 7,013,461 B2 * | 3/2006 | Hellerstein et al. | .......... | 717/177 |
| 2002/0010910 A1 * | 1/2002 | Crudele et al. | ................ | 717/4 |
| 2002/0100036 A1 * | 7/2002 | Moshir et al. | ............... | 717/173 |
| 2002/0129356 A1 * | 9/2002 | Hellerstein et al. | .......... | 717/177 |
| 2003/0126592 A1 * | 7/2003 | Mishra et al. | ............... | 717/176 |
| 2004/0003266 A1 * | 1/2004 | Moshir et al. | ............... | 713/191 |
| 2004/0260800 A1 * | 12/2004 | Gu et al. | ..................... | 709/223 |

(Continued)

FOREIGN PATENT DOCUMENTS

EP 1-096-374 A2 * 2/2001

(Continued)

OTHER PUBLICATIONS

Heiler, Kirsten, et al., "Policy Driven Configuration Management of Network Devices", Network Operations and Management Symposium, vol. 3, Kyoto, Japan, Apr. 15-19, 1996, pp. 674-689.*

(Continued)

Primary Examiner—Robert Stevens
(74) Attorney, Agent, or Firm—Gunnison, McKay & Hodgson, L.L.P.; Serge J. Hodgson

(57) ABSTRACT

A target, such as one or more computer systems, is automatically provisioned with the latest available versions of programs, such as an operating system program and/or application programs, in accordance with a selected policy and based on a stored user state package. In some embodiments, user state settings present in the stored user state package are restored to the target. In some embodiments, user confirmation or denial of the selection of a program for installation to the target is requested where the program was not identified in the user state package.

20 Claims, 8 Drawing Sheets

U.S. PATENT DOCUMENTS

| | | | |
|---|---|---|---|
| 2004/0261060 A1* | 12/2004 | Haselden et al. | 717/120 |
| 2005/0075115 A1* | 4/2005 | Corneille et al. | 455/456.3 |
| 2005/0080811 A1* | 4/2005 | Speeter et al. | 707/102 |
| 2005/0091346 A1* | 4/2005 | Krishnaswami et al. | 709/220 |
| 2005/0091535 A1* | 4/2005 | Kavalam et al. | 713/201 |
| 2005/0091655 A1* | 4/2005 | Probert et al. | 718/100 |
| 2005/0132123 A1* | 6/2005 | Glaum et al. | 711/100 |
| 2005/0132179 A1* | 6/2005 | Glaum et al. | 713/1 |
| 2005/0132350 A1* | 6/2005 | Markley et al. | 717/168 |
| 2005/0132356 A1* | 6/2005 | Cross et al. | 717/174 |
| 2005/0220080 A1* | 10/2005 | Ronkainen et al. | 370/352 |
| 2006/0020937 A1* | 1/2006 | Schaefer | 717/175 |
| 2006/0037000 A1* | 2/2006 | Speeter et al. | 717/120 |
| 2006/0080656 A1* | 4/2006 | Cain et al. | 717/174 |
| 2006/0085686 A1* | 4/2006 | Cheston et al. | 714/38 |
| 2006/0092861 A1* | 5/2006 | Corday et al. | 370/256 |
| 2006/0129419 A1* | 6/2006 | Flaxer et al. | 705/1 |
| 2006/0129518 A1* | 6/2006 | Andreev et al. | 707/1 |
| 2006/0130133 A1* | 6/2006 | Andreev et al. | 726/11 |
| 2006/0143144 A1* | 6/2006 | Speeter et al. | 706/47 |
| 2006/0149408 A1* | 7/2006 | Speeter et al. | 700/126 |
| 2006/0161895 A1* | 7/2006 | Speeter et al. | 717/121 |
| 2006/0174319 A1* | 8/2006 | Kraemer et al. | 726/1 |
| 2006/0179116 A1* | 8/2006 | Speeter et al. | 709/217 |
| 2007/0168349 A1* | 7/2007 | Sanghvi et al. | 707/10 |
| 2007/0169109 A1* | 7/2007 | Neswal | 717/174 |
| 2007/0169113 A1* | 7/2007 | Moore et al. | 717/174 |
| 2007/0261048 A1* | 11/2007 | Bernabeu-Auban et al. | 717/170 |

FOREIGN PATENT DOCUMENTS

| | | |
|---|---|---|
| EP | 1-492-002 A2 * | 12/2004 |
| EP | 1-526-454 A2 * | 4/2005 |
| EP | 1-548-586 A2 * | 6/2005 |

OTHER PUBLICATIONS

Bantz, David, et al., "Challenges in Autonomic Personal Computing", INDIN 2003, Aug. 21-24, 2003, pp. 451-456.*

"About LinQup", Dec. 26, 2003, 1 page (downloaded from: web.archive.org/web/20031226173132/http://www.linqup.com/about_linqup.html).*

"Innovative Application Design with .NET Technologies", NeoWorks Case Study, © 2005, 1 page.*

"Innovative Application Design and Development", NeoWorks Case Study, © 2005, 2 pages.*

Keller, Alexander, et al., "Automating the Provisioning of Application Services with the BPEL4WS Workflow Language", DSOM 2004, LNCS 3278/2004, Oct. 20, 2004, pp. 15-27.*

Bahati, Raphael M., et al., "Using Policies to Drive Autonomic Management", WoWMoM '06, Jun. 26-29, 2006, pp. 1-5.* van der Storm, Tijs, "Continuous Release and Upgrade of Component-Based Software", SCM 2005, Lisbon, Portugal, Sep. 5-6, 2005, pp. 43-57.*

Dunagan, John, et al., "Towards a Self-Managing Software Patching Process Using Black-Box Persistent-State Manifests", ICAC '04, May 17-18, 2004, pp. 106-113.*

Parrish, Allen, et al., " A Conceptual Foundation for Component-Based Software Deployment", Journal of Systems and Software, vol. 57, Issue 3, Jul. 15, 2001, pp. 193-200.*

Taconet, Chantal, et al., "Context Aware Deployment for Mobile Users", COMPSAC '03, Nov. 3-6, 2003, pp. 74-81.*

Hall, Richard S., et al., "A Cooperative Approach to Support Software Deployment Using the Software Dock", ICSE '99, Los Angeles, CA, May 15-22, 1999, pp. 174-183.*

"Non-Technical Overview", p. 1-3 [online]. Retrieved on Oct. 17, 2006. Retrieved from the Internet:<URL:http://www.linqup.com/linqup_product.html>, Author unknown.

"Product Data Sheet", pp. 1-2 [online]. Retrieved on Oct. 17, 2006. Retrieved from the Internet:<URL:http://www.linqup.com/archive/linqup_product_data_sheet.pdf>, Author unknown.

"Product Description", p. 1-4 [online]. Retrieved on Oct. 17, 2006. Retrieved from the Internet:<URL:http://www.linqup.com/linqup_productd.html>, Author unknown.

* cited by examiner

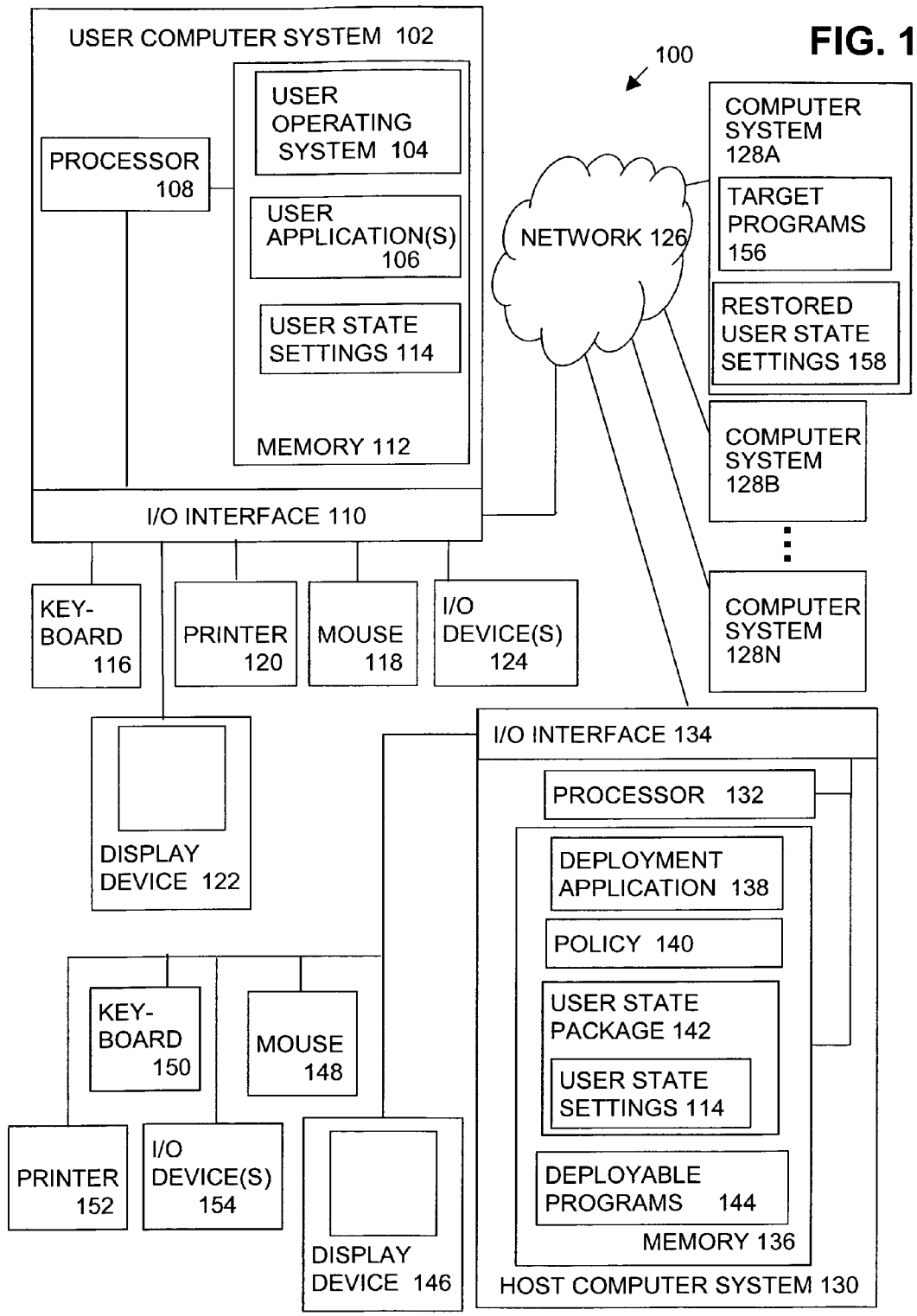

OPERATING SYSTEM AND APPLICATION DEPLOYMENT BASED ON STORED USER STATE AND ORGANIZATIONAL POLICY

BACKGROUND

1. Field of the Invention

The present invention relates to computer systems. More particularly, the present invention relates to a system and method for provisioning target computer system(s) with programs, such as an operating system program and application program(s), in accordance with a selected policy and based on a stored user state.

2. Description of the Related Art

A user state on a computer system is a collection of data, such as user state settings, related to programs, such as operating system programs and application programs, on the computer system. Conventionally, a stored user state, also termed a user state package, is created by obtaining selected user state data from registries and files on the computer system, and storing the collected user state data as a stored user state package. User states packages are typically created, for example, by a system administrator, for installation to another computer system, or for backup purposes.

When a policy, such as an organizational policy, stipulates selected policy compliant programs and/or program versions for installation on computer systems, prior to restoring a user state package to a computer system, a system administrator must first provision the computer system, to which the user state package will be restored, with an operating system image and applications in accordance with the organizational policy. Conventionally this procedure is manually performed by the system administrator, and is often a time consuming process for the system administrator to select and obtain policy compliant programs and determine and obtain program version updates.

SUMMARY OF THE INVENTION

In accordance with one embodiment of the present invention, a computer implemented method includes receiving a selection of a user state package to apply to a target, the user state package including at least one or more user state settings. A selection of a policy to apply to the target is received, the policy identifying one or more policy compliant programs. A selection of a target is received, the target identifying at least one or more computer systems. One or more user state package programs are automatically determined based on at least one or more of the user state settings, and the one or more policy compliant programs are automatically determined from the policy. One or more target programs are selected for application to the target from a group consisting of the one or more user state package programs and the one or more policy compliant programs. In one embodiment, the target programs are automatically deployed to and installed on the target, and the user state settings are restored to the target.

In accordance with another embodiment, a user input confirming the selection of a program (including program versions) not identified as a user state package program is obtained prior to selecting the program as a target program.

Embodiments in accordance with the invention permit a user, such as a system administrator, to assign a user state package and policy to a target and to have target programs, such as an operating system program and application programs, automatically deployed and installed on the target in accordance with the selected policy and based on the user state package. Embodiments in accordance with the invention, further automatically restore the user state settings to the target, as applicable. In some embodiments, the user state settings are automatically transformed as needed for use by a target program.

Embodiments are best understood by reference to the following detailed description when read in conjunction with the accompanying drawings.

BRIEF DESCRIPTION OF THE DRAWINGS

FIG. 1 is a diagram of a computer system that includes a deployment application executing on a host computer system in accordance with one embodiment of the present invention.

Common reference numerals are used throughout the drawings and detailed description to indicate like elements.

DETAILED DESCRIPTION

Figure 2A:
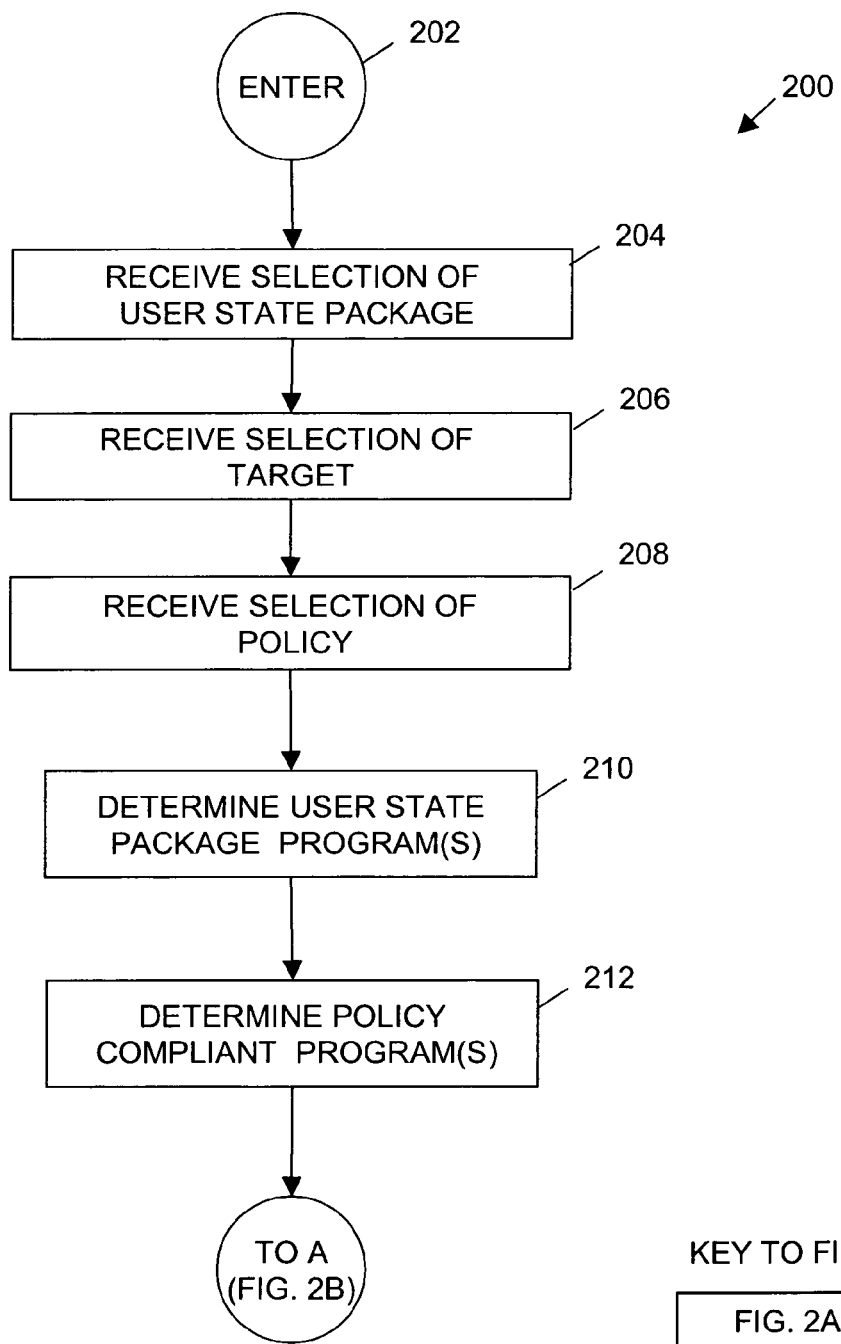
FIG. 2 is a key to FIGS. 2A, 2B, and 2C which illustrate a flow diagram of method for automatically provisioning a target with programs determined in accordance with a selected policy and based on a stored user state package in accordance with one embodiment of the present invention.

In accordance with one embodiment, referring generally to FIG. 2A, the selection of a stored user state package, such as by a system administrator, is received (operation 204) for application to a target. The selection of the target, such as by the system administrator, is received (operation 206). The selection of a policy, such as by the system administrator, is received (operation 208) for application to the target. User state package programs, such as operating system programs and application programs for which settings are present in the user state package, are determined (operation 210). Policy compliant programs, such as operating system programs and application programs which are identified in the selected policy are determined (operation 212).

Figure 2B:
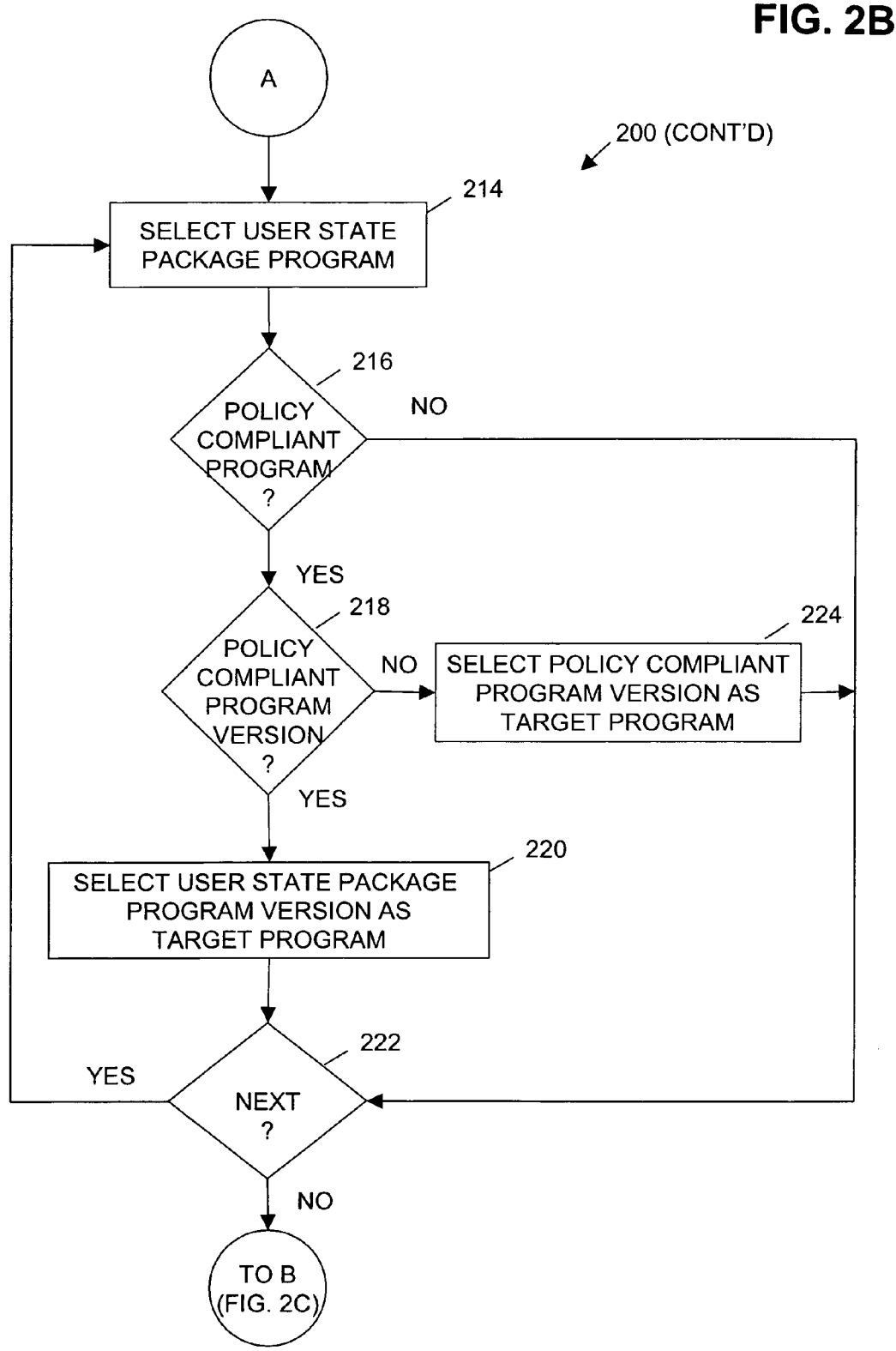

Referring generally now to FIG. 2B, each user state package program is automatically selected (operation 214) for evaluation with the selected policy, and a determination is made whether each user state package program corresponds to a policy compliant program (check operation 216). When a selected user state package program does not correspond to a policy compliant program ("NO"), the user state package program is automatically not selected as a target program. Alternatively, when a selected user state package program corresponds to a policy compliant program ("YES"), a determination is made whether the version of the user state package program, if any, corresponds to a version of a corresponding policy compliant program (check operation 218).

When the version of the user state package program corresponds to a version of a corresponding policy compliant program ("YES"), the user state package program and version is automatically selected as a target program (operation 220). Otherwise, when a selected user state package program is a policy compliant program but the version does not correspond to a version of a corresponding policy compliant program ("NO"), the policy compliant program and version is automatically selected as a target program (operation 224). Each user state package program is incremented through (check operation 222) until each user state package program is evaluated in accordance with the selected policy.

Figure 2C:
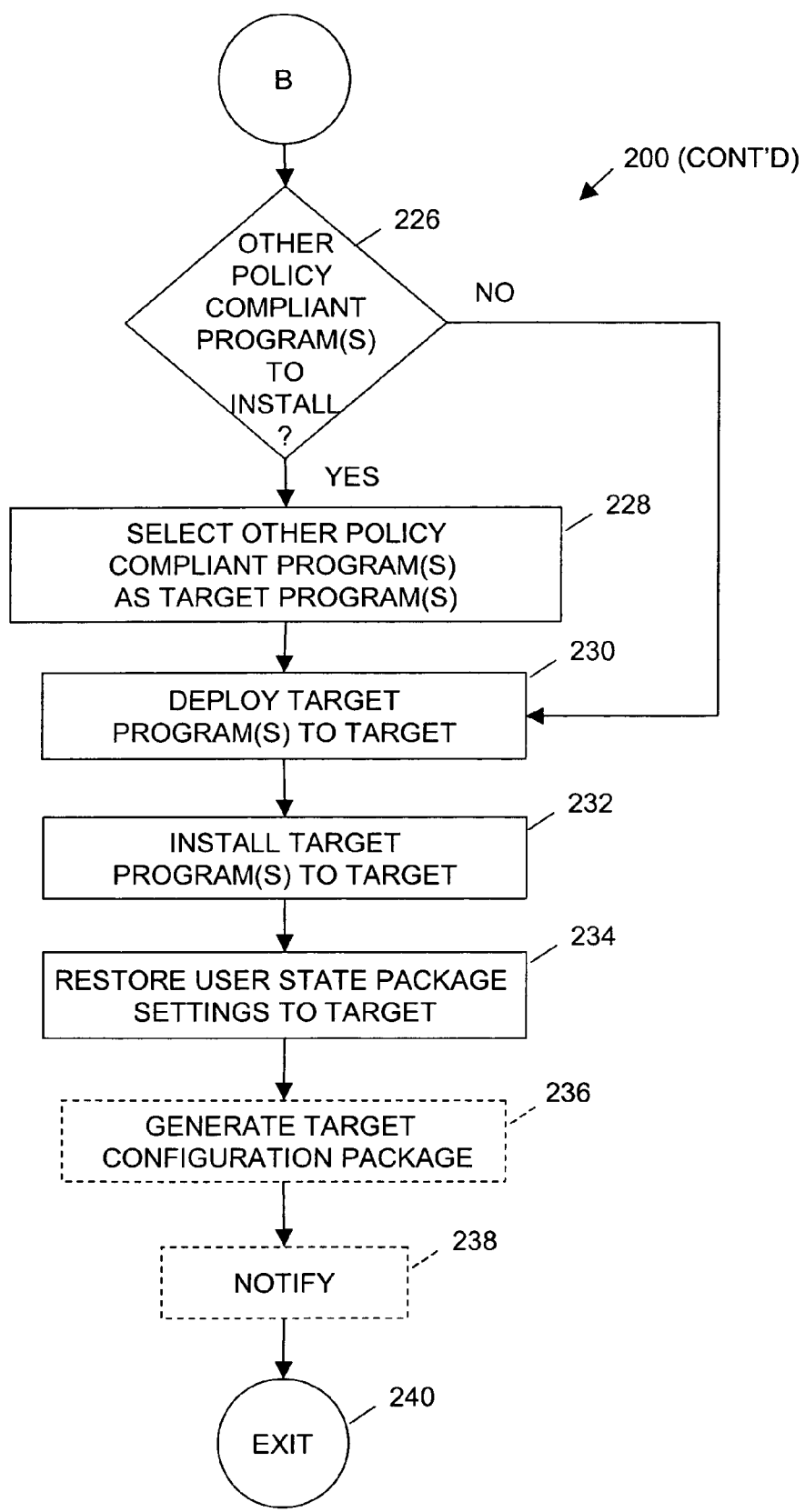

Referring generally now to FIG. 2C, the selected policy is automatically evaluated to determine whether there are policy compliant programs to be selected as target programs, for example, required policy compliant programs, which are not currently selected as target programs (check operation 226). When there are policy compliant programs to be selected as target programs ("YES"), those policy compliant programs, i.e., those identified in check operation 226, are automatically selected as target programs (operation 228). Otherwise, when there are no policy compliant programs to be selected as target programs ("NO"), the target programs are automatically deployed to the target (operation 230) and automatically installed on the target (operation 232).

The user state package, e.g., the user state settings in the user state package, are automatically restored to the target (operation 234). In some embodiments, during restoration the user state settings are transformed, as applicable, for use by corresponding target programs installed on the target. In some embodiments, optionally, a target configuration package is generated identifying each of the target programs and user state settings installed on the target (operation 236).

In some embodiments, optionally, a notification is generated (operation 238), for example providing a list of the target programs and providing an installation status.

Figure 3A:
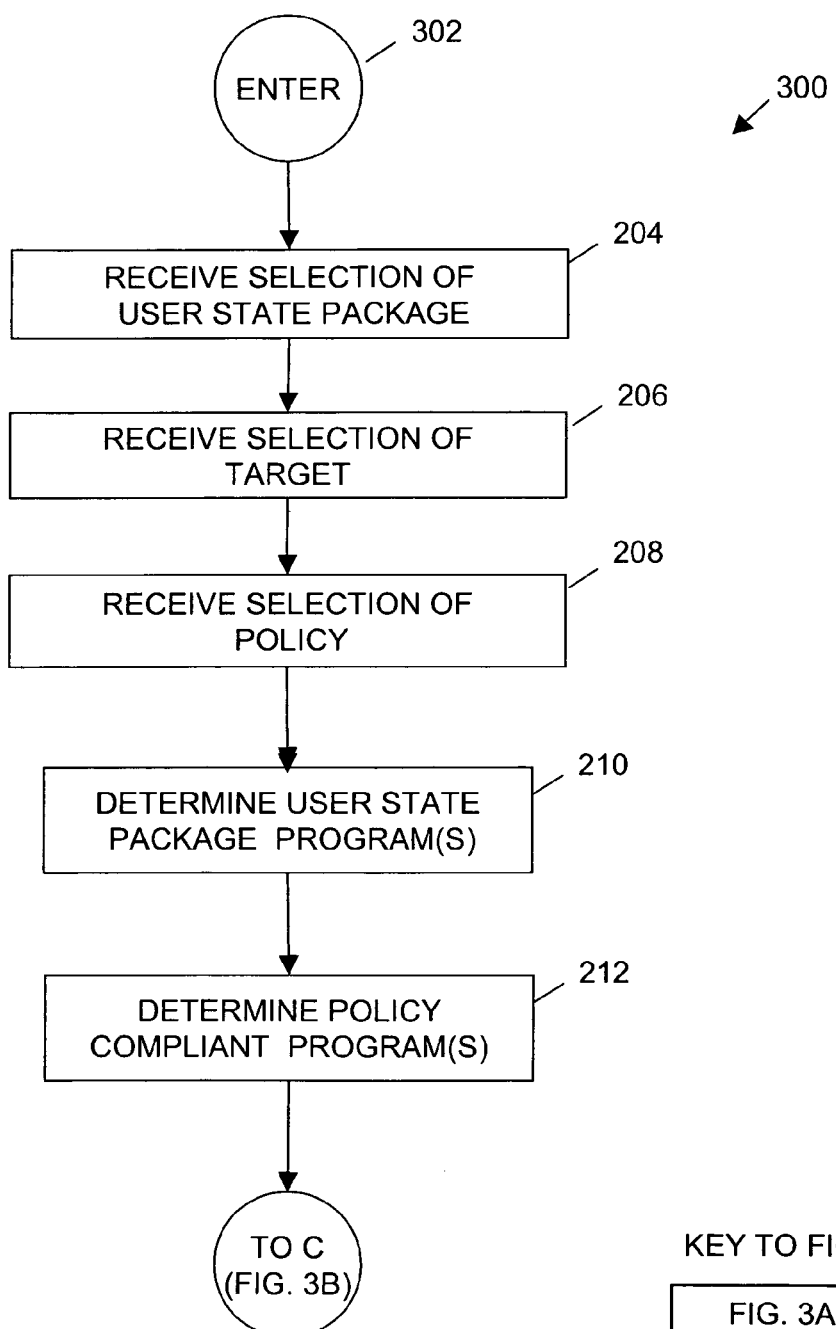
FIG. 3 is a key to FIGS. 3A, 3B, 3C, and 3D which illustrate a flow diagram of method for automatically provisioning a target with programs determined in accordance with a selected policy and based on a stored user state package and user input in accordance with one embodiment of the present invention.
Figure 3B:
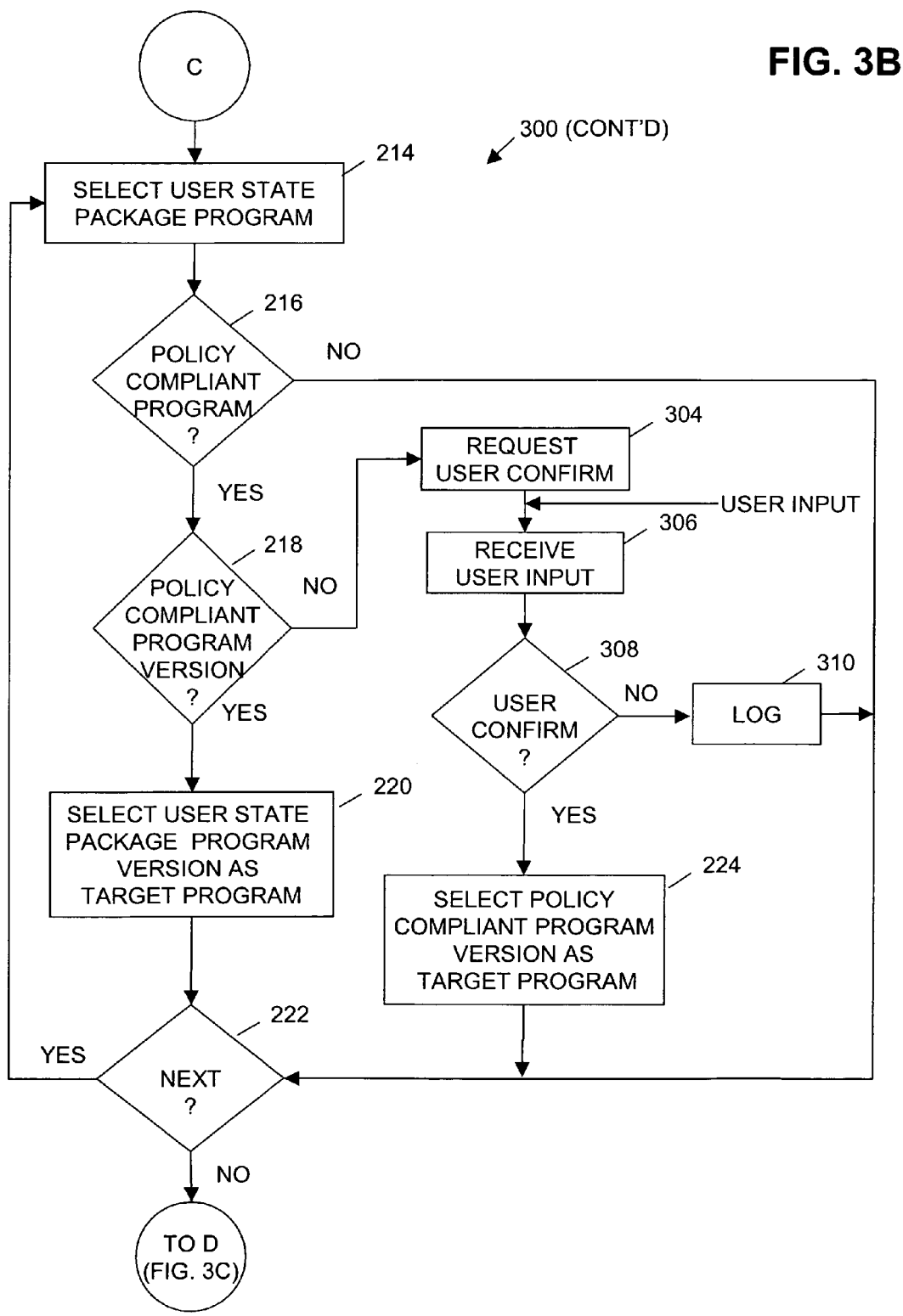
Figure 3C:
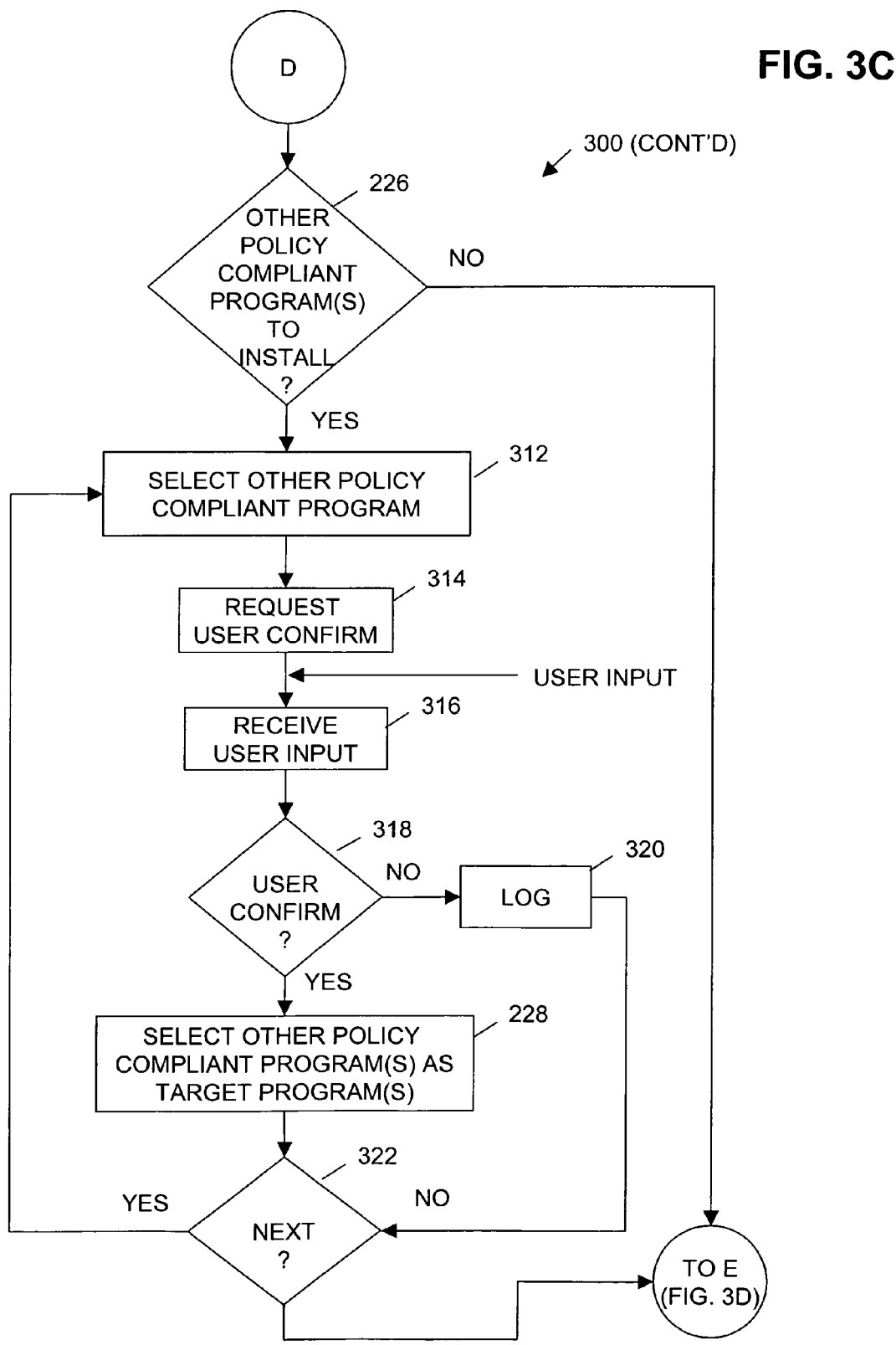

In accordance with another embodiment, referring generally now to FIGS. 3A, 3B, and 3C, a method 300 is also described which prompts user input to confirm or deny the selection of a policy compliant program version as a target program, e.g., a version update (operations 304, 306, and 308), and to confirm or deny the selection of a policy compliant program, e.g., a required policy compliant program, not earlier selected as a target program (operations 312, 314, 316, and 318). In one embodiment, denial of the selection of the policy compliant program version and/or policy compliant program as a target program by the user is logged (operations 310 and 320, respectively), such as for later notification and/or analysis.

More particularly, FIG. 1 is a diagram of a computer system 100 that includes a deployment application 138 executing on a host computer system 130 in accordance with one embodiment of the present invention. Host computer system 130, a first computer system, typically includes a central processing unit (CPU) 132, sometimes called a processor 132, an input/output (I/O) interface 134, and a memory 136. In various embodiments, I/O interface 134 includes analog modems, digital modems, and/or a network interface card.

Host computer system 130 further includes standard devices such as a keyboard 150, a mouse 148, a display device 146, and, a printer 152, as well as, one or more standard input/output (I/O) device(s) 154, such as a compact disk (CD) or DVD drive, floppy disk drive, or other digital or waveform ports for inputting data to and outputting data from host computer system 130. In some embodiments, host computer system 130 can include an aural delivery system (not shown), such as speakers for outputting information to a user.

In one embodiment, deployment application 138 is loaded onto host computer system 130 via an I/O device 154, such as from a CD, DVD, or floppy disk containing deployment application 138. In one embodiment, deployment application 138 is stored, for example, in memory 136 of host computer system 130 and executed on host computer system 130.

In one embodiment host computer system 130 includes one or more stored policy(ies) 140, one or more stored user state package(s) 142, and one or more deployable program(s) 144. In one embodiment, deployable program(s) 144 are suitable for deployment and installation to a target and can include complete programs, such as an operating system program and one or more application programs, as well as program updates, such as program version updates.

In one embodiment, user state package(s) 142, policy(ies) 140, and deployable program(s) 144 are stored on host computer system 130, such as in memory 136, however, in other embodiments, some or all of user state package(s) 142, policy (ies) 140, and deployable program(s) 144 are stored on host computer system 130 and/or one or more other computer systems (not shown) accessible by host computer system 130.

In one embodiment, a stored user state package, such as a user state package 142, is a collection of data, such as user state settings, related to programs, such as operating system programs and application programs, on a computer system. For example, in the present embodiment, user state package 142 is a collection of data including user state settings 114 obtained from a user computer system 102, related to a user operating system 104 and one or more user application(s) 106 on user computer system 102.

As earlier described, typically a stored user state package is created by collecting user state settings, e.g., user state settings 114, from registries and files on a computer system, e.g., user computer system 102, and storing the collected data as a user state package, e.g., as user state package 142. Herein user state settings can include both default settings associated with a program, as well as user defined settings, if any, set by a user for an associated program. Examples of user state settings include, but are not limited to, font type, document margins, line spacing, and automatic formatting.

In some embodiments, a user state package, e.g., user state package 142, includes a record of the program name, including program version, if any, of each program for which user state settings are stored on the user computer system, e.g., user computer system 102. Stored user state packages and user state settings, as well as the generation of a user state package, are well known to those of skill in the art and are not further described herein to avoid detracting from the description of the invention. Herein the unmodified terms program and programs includes operating system programs and/or application programs, unless otherwise specified.

In one embodiment, host computer system 130 is a server computer system. Host computer system 130 is coupled to user computer system 102, i.e., a second computer system, of computer system 100 by a network 126. User computer system 102, sometimes referred to as a client computer system, typically includes a central processing unit (CPU) 108, sometimes called a processor 108, an input/output (I/O) interface 110, and a memory 112. User computer system 102 can further include standard devices such as a keyboard 116, a mouse 118, a display device 122, and, a printer 120, as well as one or more standard input/output (I/O) device(s) 124, such as a compact disk (CD) or DVD drive, floppy disk drive, or other digital or waveform ports for inputting data to and outputting data from user computer system 102. In various embodiments, I/O interface 110 includes analog modems, digital modems, and/or one or more network interface card(s).

In one embodiment, user computer system 102 includes user operating system 104, i.e., an operating system program, and one or more user application(s) 106, i.e., one or more application programs. In one embodiment, user state settings 114 are stored on user computer system 102, for example, in various structures of memory 112, such as in files and registries of user computer system 102. The location and storage of user settings on a user computer system are well known to those of skill in the art and not further described herein to avoid detracting from the principles of the invention.

Additional computer systems, such as computer systems 128A-128N, one or more third computer systems, are also coupled to host computer system 130 by network 126. In one embodiment, computer systems 128A-128N are similar to user computer system 102 and, for example, include a central processing unit, an input/output (I/O) interface, and a memory. Computer systems 128A-128N may further include standard devices like a keyboard, a mouse, a printer, and a display device. In one embodiment, one or more of computer systems 128A-128N are designated as a target to receive selected target programs, e.g., target programs 156, and user state package settings, if applicable, e.g., restored user state package setting 158, based on a selected user state package and in accordance with a selected policy as further herein described.

Herein network 126 can be any network or network system that is of interest to a user, including a local network, or the Internet. Further, the particular type of and configuration of host computer system 130, user computer system 102, and computer systems 128A-128N are not essential to this embodiment of the invention.

FIG. 2 is a key to FIGS. 2A, 2B, and 2C which illustrate a flow diagram of method 200 for automatically provisioning a target with programs determined in accordance with a selected policy and based on a stored user state package in accordance with one embodiment of the present invention. Referring now to FIGS. 1, and 2A together, in one embodiment, execution of deployment application 138 by processor 132 results in the operations of method 200 as described below. From an ENTER operation 202, processing transitions to a RECEIVE SELECTION OF USER STATE PACKAGE operation 204.

In RECEIVE SELECTION OF USER STATE PACKAGE operation 204, in one embodiment, the selection of a user state package is received. In one embodiment, a user, such as a system administrator, selects a stored user state package 142 to apply to a target, and the selection is communicated to deployment application 138.

Herein, in one embodiment, a user state package, i.e., user state package 142, can represent a single user, or a group of users, a single computer system, or a group of computer systems. In one embodiment, user state package 142 includes at least user state settings, e.g., user state settings 114, for operating systems and applications, e.g., user operating system 104 and user application(s) 106, on a computer system, e.g., user computer system 102. In some embodiments, user state package 142 can further include a record of each program including program version, if any, for which user state settings are stored.

In one embodiment, one or more user state packages 142 are displayed, such as on display device 146, and a user, such as a system administrator, selects a user state package 142 for application to a target. For example, in one embodiment, one or more user state package icons representing different user state packages, e.g., user state package 142, are displayed on display device 146. The system administrator positions a cursor, such as via mouse 148, over a desired user state package icon and clicks on the user state package icon to select an associated user state package 142.

As another example, in one embodiment, the system administrator positions a cursor, such as via mouse 148, over a desired user state package icon and drags the user state package icon to a designated user state package selection area displayed on display device 146 to select an associated user state package 142. From RECEIVE SELECTION OF USER STATE PACKAGE operation 204, processing transitions to a RECEIVE SELECTION OF TARGET operation 206.

In RECEIVE SELECTION OF TARGET operation 206, in one embodiment, the selection of a target is received. In one embodiment, a user, such as the system administrator, selects one or more targets, and the selection is communicated to deployment application 138.

Herein, in one embodiment, a target can represent a single user, or a group of users, a single computer system, or a group of computer systems. A target can represent the users or computer systems in an organization, domain, or group.

In one embodiment, one or more targets are displayed, such as on display device 146, and the system administrator selects one or more targets. For example, in one embodiment, one or more target icons representing different targets, such as target icons representing one or more computer systems 128A-128N, are displayed on display device 146. The system administrator positions a cursor over a desired target icon, such as via mouse 148, and clicks on the target icon to select an associated target, e.g., computer system 128A.

As another example, in one embodiment, the system administrator positions a cursor over a desired target icon, such as via mouse 148, and drags the target icon to a designated target selection area displayed on display device 146 to select an associated target, such as for example, computer system 128A. From RECEIVE SELECTION OF TARGET operation 206, processing transitions to a RECEIVE SELECTION OF POLICY operation 208.

In RECEIVE SELECTION OF POLICY operation 208, in one embodiment, the selection of a policy is received. In one embodiment, a user, such as the system administrator, selects a policy 140 to apply to a target, and the selection is communicated to deployment application 138.

Herein, in one embodiment, a policy can represent an organizational policy, a domain policy, a group policy, a user policy, or a machine policy. In one embodiment, a policy includes at least a record of programs determined to be compliant with the policy, herein termed policy compliant programs, including the policy compliant program version, if any. In some embodiments, the policy, e.g., policy 140, further specifies policy compliant settings for one or more of the policy compliant programs.

In one embodiment, one or more policies are displayed, such as on display device 146, and the system administrator selects one or more policies. For example, in one embodiment, one or more policy icons representing one or more policies 140 are displayed on display device 146. The system administrator positions a cursor over a policy icon, such as via mouse 148, and clicks on the selected policy icons to select one or more associated policies 140.

As another example, in one embodiment, the system administrator positions a cursor over a desired policy icon, such as via mouse 148, and drags the policy icon to a designated policy selection area displayed on display device 146 to select an associated policy, such as for example, a policy 140. From RECEIVE SELECTION OF POLICY operation 208, processing transitions to a DETERMINE USER STATE PACKAGE PROGRAM(S) operation 210.

In DETERMINE USER STATE PACKAGE PROGRAM (S) operation 210, programs for which user state settings are present in the selected user state package, herein termed user state package programs, are automatically determined. In one embodiment, the user state package program(s) are automatically determined from information present in the user state package, e.g., user state package 142. Determination of programs from user state settings is well known to those of skill in the art and not further described herein to avoid detracting from the principles of the invention.

In one embodiment, the user state package program(s) are automatically determined based on the user state settings, e.g., user state setting 114, present in the user state package, e.g., user state package 142. In one embodiment, each user state package program determined from the user state package identifies a particular user state package program including user state package program version, if any.

For example, assume user state package 142 includes user state settings, such as user state settings 114, and deployment application 138 automatically determines the user state package programs as:

Microsoft Windows (version) XP, and
Microsoft Word (version) 97.

From DETERMINE USER STATE PACKAGE PROGRAM (S) operation 210, processing transitions to a DETERMINE POLICY COMPLIANT PROGRAM(S) operation 212.

In DETERMINE POLICY COMPLIANT PROGRAM(S) operation 212, programs identified in the selected policy, herein termed policy compliant programs, are automatically determined. In one embodiment, the policy compliant program(s) are automatically determined from information present in the policy, e.g., policy 140. In one embodiment, a policy includes at least a record of policy compliant programs, including the policy compliant program version, if any. For example, assume policy 140 specifies policy compliant programs, and deployment application 138 automatically determines the policy compliant programs as:

Microsoft Windows (version) XP,
Microsoft Word (version) 2007,
Microsoft Word (version) 2000, and
Excel.

From DETERMINE POLICY COMPLIANT PROGRAM (S) operation 212, processing transitions to a SELECT USER STATE PACKAGE PROGRAM operation 214 (FIG. 2B).

Referring now to FIG. 2B, in SELECT USER STATE PACKAGE PROGRAM operation 214, in one embodiment, an initial user state package program, determined in operation 210, is automatically selected for comparison to policy compliant programs determined in operation 212. For example, assume the user state package program Microsoft Windows XP is initially selected for comparison to policy compliant programs identified in policy 140. From SELECT USER STATE PACKAGE PROGRAM operation 214, processing transitions to a POLICY COMPLIANT PROGRAM check operation 216.

In POLICY COMPLIANT PROGRAM check operation 216, in one embodiment, the user state package program selected in operation 214 is automatically compared to policy compliant programs determined in operation 212. In one embodiment, the user state package program is automatically compared to each policy compliant program in policy 140 to determine if the user state package program corresponds to one or more policy compliant programs.

In an alternative embodiment, the comparison is limited to comparisons between similar program types. For example, in one embodiment, a user state package program that is an operating system program is compared with policy compliant programs that are operating system programs. Similarly, a user state package program that is a word processing program is compared with policy compliant programs that are word processing programs.

In one embodiment, if the user state package program corresponds to one or more policy compliant programs, the user state package program is automatically determined to correspond to a program compliant program. Alternatively, if the user state package program does not correspond to one or more policy compliant programs, the user state package program is automatically determined not to correspond to a program compliant program.

For example, assume the user state package program Microsoft Windows XP is initially selected in operation 214 and compared to the policy compliant program Microsoft Window XP, Microsoft Word 2000 and Microsoft Word 2007. The user state package program Microsoft Windows XP corresponds to the policy compliant program Microsoft Windows XP without regard to version. In particular, the user state package program, e.g., Microsoft Windows, and the policy compliant program, e.g., Microsoft Windows, correspond without consideration of the version in this operation. Alternatively, if, for example, Microsoft Windows (any version) had not been identified as a policy compliant program, the user state package program Microsoft Windows XP would not correspond to one or more policy compliant programs.

In one embodiment, if the user state package program is determined to correspond to one or more policy compliant programs ("YES"), processing transitions from POLICY COMPLIANT PROGRAM check operation 216 to a POLICY COMPLIANT PROGRAM VERSION check operation 218. Otherwise, if the user state package program is determined not to correspond to one or more policy compliant programs ("NO"), processing transitions from POLICY COMPLIANT PROGRAM check operation 216, to a NEXT check operation 222, further described herein.

In POLICY COMPLIANT PROGRAM VERSION check operation 218, in one embodiment, a determination is made whether the user state package program version corresponds to a policy compliant program version. In one embodiment, the user state package program version is compared to the policy compliant program versions for each of the policy compliant programs corresponded to in check operation 216.

For example, the user state package program Microsoft Windows version XP of is compared to each policy compliant program version for each policy compliant program corresponded to in check operation 216. In the present example, the user state package program version XP of Microsoft Windows corresponds to the policy compliant program version XP of Microsoft Windows. In the alternative, if, for example, the user state package program version did not match a policy compliant program version, for example, if only version 2000 of Microsoft Windows had been specified as a policy compliant program version in policy 140, the user state package program version would not correspond to a policy compliant program version.

In one embodiment, if the user state package program version does not correspond to a policy compliant program version ("NO"), processing transitions from POLICY COMPLIANT PROGRAM VERSION check operation 218 to a SELECT POLICY COMPLIANT PROGRAM VERSION AS TARGET PROGRAM operation 224, further described herein. Alternatively, if the user state package program version corresponds to a policy compliant program version ("YES"), processing transitions from POLICY COMPLIANT PROGRAM VERSION check operation 218 to a SELECT USER STATE PACKAGE PROGRAM VERSION AS TARGET PROGRAM operation 220.

In SELECT USER STATE PACKAGE PROGRAM VERSION AS TARGET PROGRAM operation 220, in one embodiment, the user state package program version, is automatically selected as a target program. In one embodiment, the user state package program version is logged as a target program to a memory structure of deployment application 138, such as a target program list, that includes an entry for each target program. Herein a target program is a program, including version, if any, selected as a target program in accordance with an embodiment of the invention. From SELECT USER STATE PACKAGE PROGRAM VERSION AS TARGET PROGRAM operation 220, processing transitions to NEXT check operation 222.

In NEXT check operation 222, a determination is made whether a next user state package program is to be evaluated. If a next user state package program is to be evaluated, from NEXT check operation 222, processing returns to SELECT USER STATE PACKAGE PROGRAM operation 214 with a next user state package program being selected. Otherwise, if a next user state package program is not to be evaluated, from NEXT check operation 222, processing transitions to an OTHER POLICY COMPLIANT PROGRAM(S) TO INSTALL check operation 226 (FIG. 2C) further described herein.

In the present example, the user state package program, Microsoft Word 97 remains to be next evaluated. Continuing the present example, Microsoft Word Version 97 is next selected in operation 214. In check operation 216, Microsoft Word Version 97 is compared to the policy compliant programs Microsoft Window XP, Microsoft Word 2000 and Microsoft Word 2007. The user state package program Microsoft Word 97 corresponds to the policy compliant programs Microsoft Word 2007 and Microsoft Word 2000, regardless of version, i.e., Microsoft Word. However, in check operation 218, Microsoft Word version 97 does not correspond to either the policy compliant programs Microsoft Word version 2007 or 2000. Thus, processing transitions from check operation 218 to SELECT POLICY COMPLIANT PROGRAM VERSION AS TARGET PROGRAM operation 224.

In SELECT POLICY COMPLIANT PROGRAM VERSION AS TARGET PROGRAM operation 224, the policy compliant program version corresponded to in operation 216 is selected for installation on the target. In one embodiment, the policy compliant program version corresponding to the user state package program in check operation 216 is logged as a target program to a memory structure of deployment application 138, such as to the target program list earlier described.

In one embodiment, where more than one policy compliant program version is identified, the policy compliant program having the most recent version is selected. In other embodiments, different version selection criteria can be used.

In the present example, two policy compliant program versions of Microsoft Word, i.e., version 2007 and 2000 are specified in policy 140. In the present example, it is assumed that the most recent version is to be selected, and thus in the present example, the policy compliant program version Microsoft Word 2007 is selected as the target program. From SELECT POLICY COMPLIANT PROGRAM VERSION AS TARGET PROGRAM operation 224, processing transitions to NEXT check operation 222 as earlier described.

In the present example, in NEXT check operation 222, a determination is made there are no further user state package programs to evaluate ("NO"), and processing transitions from NEXT check operation 222 to OTHER POLICY COMPLIANT PROGRAM(S) TO INSTALL check operation 226 (FIG. 2C).

Referring now to FIG. 2C, in OTHER POLICY COMPLIANT PROGRAM(S) TO INSTALL check operation 226, a determination is automatically made whether other policy compliant program(s) specified in the policy remain to be selected as target programs. In one embodiment, a determination is made whether each policy compliant program that is required to be installed on a target by policy 140 is currently selected as a target program.

Herein in one embodiment, a policy compliant program that is required to be installed on a target by a policy is termed a required policy compliant program. In one embodiment, a required policy compliant program is identified in a policy, e.g., policy 140, using a required program identifier, such as required program flag, or by otherwise indicating in the policy, e.g., policy 140, that an associated policy compliant program is required to be installed on the target.

In one embodiment, each required policy compliant program of the policy, e.g., policy 140, is automatically compared to each target program identified in the target program list. More particularly, in one embodiment, each required policy compliant program of the policy, e.g., policy 140, is automatically compared to each target program identified in the target program list to determine whether or not there is a corresponding target program.

In one embodiment, when each required policy compliant program is determined to correspond to a target program, there are no other policy compliant programs to select as target program, ("NO"), and processing transitions from OTHER POLICY COMPLIANT PROGRAM(S) TO INSTALL check operation 226 to a DEPLOY TARGET PROGRAM(S) TO TARGET operation 230, described further herein. Alternatively, in one embodiment, when one or more required policy compliant programs are determined not to correspond to a target program, there are other policy compliant programs to select as target programs ("YES"), and processing transitions from OTHER POLICY COMPLIANT PROGRAM(S) TO INSTALL check operation 226 to a SELECT OTHER POLICY COMPLIANT PROGRAM(S) AS TARGET PROGRAM(S) operation 228.

In the present example, assume that the policy compliant program Excel is a required policy compliant program. The required policy compliant program Excel is automatically compared to each target program, e.g., Microsoft Windows XP and Microsoft Word 2007, and a determination is made that there no corresponding target programs. Further, in the present example, there are no other required policy compliant programs to evaluate. Thus, in the present example, there is an other policy compliant program to install ("YES"), and processing transitions from OTHER POLICY COMPLIANT PROGRAM(S) TO INSTALL check operation 226 to a SELECT OTHER POLICY COMPLIANT PROGRAM(S) AS TARGET PROGRAM(S) operation 228.

In SELECT OTHER POLICY COMPLIANT PROGRAM(S) AS TARGET PROGRAM(S) operation 228, in one embodiment, each policy compliant program determined in check operation 226 is automatically selected as a target program. In one embodiment, each policy compliant program determined in check operation 226 is logged as a target program to a memory structure of deployment application 138, such as the target program list earlier described. From SELECT OTHER POLICY COMPLIANT PROGRAM(S) AS TARGET PROGRAM(S) operation 228, processing transitions to DEPLOY TARGET PROGRAM(S) TO TARGET operation 230.

In DEPLOY TARGET PROGRAM(S) TO TARGET operation 230, in one embodiment, the programs selected as target programs are automatically deployed to the target. In one embodiment, deployable programs corresponding to each of the target programs identified in the target list are automatically obtained and are automatically communicated to the target.

In one embodiment, deployment application 138 includes or has access to programs including program version update programs, which are deployable to and installable on a target, such as deployable programs 144. In one embodiment, deployable programs 144 include at least programs corresponding to target programs.

In one embodiment, deployment application 138 automatically obtains target programs from deployable programs 144 and automatically communicates the target programs to the target, such as in one or more network packages, if needed. For example, in one embodiment, deployment application 138 communicates target programs from host computer system 130 via I/O interface 134 over network 126 to target computer system 128A.

Continuing the present example, target programs Microsoft Windows XP (selected in operation 220), Microsoft Word 2007 (selected in operation 224), and Excel (selected in operation 228) are automatically obtained from deployable programs 144 and automatically deployed to computer system 128A. From DEPLOY TARGET PROGRAM(S) TO TARGET operation 230, processing transitions to an INSTALL TARGET PROGRAM(S) TO TARGET operation 232.

In INSTALL TARGET PROGRAM(S) TO TARGET operation 232, in one embodiment, the target programs deployed in operation 230 are automatically installed on the target, e.g., target programs 156 (FIG. 1). From INSTALL TARGET PROGRAM(s) TO TARGET operation 232, processing transitions to a RESTORE USER STATE PACKAGE SETTINGS TO TARGET operation 234.

In RESTORE USER STATE PACKAGE SETTINGS TO TARGET operation 230, in one embodiment, the user state settings identified in user state package 142, e.g., user state settings 114, are automatically deployed and installed on the target as applicable, e.g., restored user state settings 158. For example, user state settings 114 in user state package 142 for target programs Microsoft Windows XP and Microsoft Word 97 are automatically communicated to and installed on the target, e.g., computer system 128A.

In one embodiment, none, some or all of the user state settings are automatically transformed for use by corresponding target program(s) installed on the target. In the present example, the user state settings 114 associated with Microsoft Word 97 are transformed for use with the target program Microsoft Word 2007 installed on the target. In one embodiment, the user state package settings and/or transformed user state package settings are automatically stored in one or more registries, files, and/or other structures present on the target, for use as settings by the corresponding program. From RESTORE USER STATE PACKAGE SETTINGS TO TARGET operation 234, processing transitions to an optional GENERATE TARGET CONFIGURATION PACKAGE operation 236, or transitions directly to a NOTIFY operation 238.

In optional GENERATE TARGET CONFIGURATION PACKAGE operation 236, in one embodiment, a target configuration package associated with the target is automatically generated. In one embodiment, the target configuration package includes at least a listing of the target programs installed on the target. In some embodiments, the target configuration package further includes the user state settings, including any transformed user state settings, installed on the target. From optional GENERATE TARGET CONFIGURATION PACKAGE operation 236, processing transitions to a NOTIFY operation 238.

In NOTIFY operation 238, in one embodiment, the user of host computer system 130 (FIG. 1), e.g., the system administrator, and/or other users, are automatically notified of the completion of the installation of the target programs and user state settings to the target. In one embodiment, a record is automatically generated and provided to the user, e.g., system administrator.

In one embodiment, the notification identifies the target program(s) and/or user state settings, deployed and installed to the target. In some embodiments, the notification identifies the user state package programs, the policy compliant programs, and the target programs.

The user is notified using any one of a number of techniques, e.g., by using a pop up window, by generating an e-mail, by writing to a file, and/or otherwise by logging the event. From NOTIFY operation 238, processing transitions to an EXIT operation 240, with processing exiting method 200.

FIG. 3 is a key to FIGS. 3A, 3B, 3C, and 3D which illustrate a flow diagram of method 300 for automatically provisioning a target with programs determined in accordance with a selected policy and based on a stored user state package and user input in accordance with one embodiment of the present invention. Referring now to FIGS. 1 and 3A together, in one embodiment, execution of deployment application 138 by processor 132 results in the operations of method 300 as described below. In one embodiment, method 300 is entered at an ENTER operation 302, and from ENTER operation 302, processing transitions to RECEIVE SELECTION OF USER STATE PACKAGE operation 204.

In the present embodiment, operations 204 through 238 are similarly performed as earlier described with reference to method 200, hereby incorporated by reference, except that at selected operations, in one embodiment, user confirmation of a selection of a program and/or program version not identified in the user state package is requested prior to selecting the program and/or program version as a target program as further described herein.

More particularly, referring now to FIG. 3B, at POLICY COMPLIANT PROGRAM VERSION check operation 218, when the user state package program version is determined not to correspond to a policy compliant program version ("NO"), processing transitions to a REQUEST USER CONFIRM operation 304. Thus, rather than automatically selecting the policy compliant program version as a target program as in operation 224 of method 200, user confirmation is requested as further detailed herein.

In REQUEST USER CONFIRM operation 304, in one embodiment, a message prompt or other notification is automatically generated and displayed and/or otherwise conveyed to the user requesting user input, such as a user confirmation input. In one embodiment, user input is requested using any one of a number of techniques, for example, by using a pop up window.

For example, in one embodiment, a pop up window is displayed to the user, such as on display device 146, with the text query "User state package program version Microsoft Word version 97 is not policy compliant. Confirm selection of policy compliant program version Microsoft Word 2007 for installation on target?" In one embodiment, graphical user interface input selection buttons, for example, "YES" and "NO" are displayed to the user.

The user inputs a selection, for example, by placing a cursor over one of the input selection buttons on display device 146, such as via mouse 148, and clicking on the input selection button to generate a selection, i.e., a user input. For example, selection of input selection button "YES" generates a confirmation of the selection of Microsoft Word 2007 as a target program. Alternatively, selection of input selection button "NO" generates a denial of the selection of Microsoft Word 2007 as a target program. From REQUEST USER CONFIRM operation 304, processing transitions to a RECEIVE USER INPUT operation 306.

In RECEIVE USER INPUT operation 306, in one embodiment, the user input is received communicating the selection requested in operation 304, for example, a confirmation or a denial is received. From RECEIVE USER INPUT operation 306, processing transitions to a USER CONFIRM check operation 308.

In USER CONFIRM check operation 308, in one embodiment, a determination is automatically made whether or not the user input received in operation 306 confirms the selection of the policy compliant program version as a target program. For example, when a confirmation is received in operation 306, the selection of Microsoft Word 2007 as a target program is confirmed. Alternatively, when a denial is received in operation 306, the selection of Microsoft Word 2007 as a target program is denied.

In one embodiment, if the user input confirms the selection of the policy compliant program version as a target program ("YES"), processing transitions from USER CONFIRM check operation 308, to SELECT POLICY COMPLIANT PROGRAM VERSION AS TARGET PROGRAM operation 224 as earlier described with reference to method 200, hereby incorporated by reference, with selection of the policy compliant program version as a target program. Otherwise, if the user input does not confirm the selection of the policy compliant program version as a target program ("NO"), the policy compliant program version is not selected as a target program and processing transitions from USER CONFIRM check operation 308, to a LOG operation 310.

In LOG operation 310, in one embodiment, the non-selection of the policy compliant program version as a target program is logged, such as to a text file, for later evaluation. From LOG operation 310, processing transitions to NEXT check operation 222 as earlier described with reference to method 200, hereby incorporated by reference.

Additionally, referring now to FIG. 3C, in OTHER POLICY COMPLIANT PROGRAM(S) TO INSTALL check operation 226, when there are one or more other policy compliant programs required to be installed to the target, such as required policy compliant programs ("YES"), processing transitions from OTHER POLICY COMPLIANT PROGRAM(S) TO INSTALL check operation 226, to a SELECT OTHER POLICY COMPLIANT PROGRAM operation 312.

In SELECT OTHER POLICY COMPLIANT PROGRAM operation 312, in one embodiment, an initial policy compliant program determined in check operation 226, e.g., a required policy compliant program, is automatically selected for comparison to target programs. For example, assuming again the program Excel is identified in policy 140 as a required policy compliant program, Excel is initially selected. From SELECT OTHER POLICY COMPLIANT PROGRAM operation 312, processing transitions to a REQUEST USER CONFIRM operation 314. Thus, rather than automatically selecting each of the policy compliant program(s) identified in check operation 226 as target programs as in operation 228 of method 200, user confirmation of each policy compliant program identified in check operation 226 is requested as further described herein.

In REQUEST USER CONFIRM operation 314, in one embodiment, a message prompt or other notification is automatically generated and displayed and/or otherwise conveyed to the user requesting user input, such as a user confirmation input. In one embodiment, user input is requested using any one of a number of techniques, for example, by using a pop up window.

For example, a pop up window is displayed to the user, such as on display device 146, with the text query "Policy compliant program Excel is required for installation to the target. Confirm selection of policy compliant program Excel for installation on target?" In one embodiment, graphical user interface input selection buttons, for example, "YES" and "NO" are displayed to the user.

The user inputs a selection, for example, by placing a cursor over one of the input selection buttons on display device 146, such as via mouse 148, and clicking on the input selection button to generate a selection, i.e., a user input. For example, selection of input selection button "YES" generates a confirmation of the selection of Excel as a target program. Alternatively, selection of input selection button "NO" generates a denial of the selection of Excel as a target program. From REQUEST USER CONFIRM operation 314, processing transitions to a RECEIVE USER INPUT operation 316.

In RECEIVE USER INPUT operation 316, in one embodiment, the user input is received communicating the selection requested in operation 314, for example, a confirmation or a denial is received. From RECEIVE USER INPUT operation 316, processing transitions to a USER CONFIRM check operation 318.

In USER CONFIRM check operation 318, in one embodiment, a determination is automatically made whether or not the user input received in operation 316 confirms the selection of the policy compliant program as a target program. For example, when a confirmation is received in operation 316, the selection of Excel as a target program is confirmed. Alternatively, when a denial is received in operation 316, the selection of Excel as a target program is denied.

In one embodiment, if the user input confirms the selection of the policy compliant program as a target program ("YES"), processing transitions from USER CONFIRM check operation 318, to SELECT OTHER POLICY COMPLIANT PROGRAM(S) AS TARGET PROGRAM(S) operation 228 as earlier described with reference to method 200, hereby incorporated by reference, with selection of the policy compliant program as a target program. Otherwise, if the user input does not confirm the selection of the policy compliant program as a target program ("NO"), the policy compliant program is not selected as a target program and processing transitions from USER CONFIRM check operation 318 to SELECT OTHER POLICY COMPLIANT PROGRAM(S) AS TARGET PROGRAM(S) operation 228.

In SELECT OTHER POLICY COMPLIANT PROGRAM(S) AS TARGET PROGRAM(S) operation 228, in the present embodiment, rather that automatically selecting each required policy compliant program identified in check operation 226 as target program(s), in one embodiment, the individual policy compliant program selected in operation 312 and confirmed in operation 318 is selected as a target program.

In an alternative embodiment, similar to the performance of operation 228 in method 200, each of the required policy compliant programs confirmed for selection as target programs in operation 318 is temporarily stored until all the policy compliant programs identified in operation 226 have been either confirmed or denied for selection as a target program and then each of the confirmed policy compliant programs are selected as target programs. From SELECT OTHER POLICY COMPLIANT PROGRAM(S) AS TARGET PROGRAM(S) operation 228, processing transitions to a NEXT check operation 322.

In NEXT check operation 322, in one embodiment, a determination is made whether a next policy compliant program identified in check operation 226 is to be selected for comparison to target programs. If a next policy compliant program is to be selected for comparison, from NEXT check operation 322, processing returns to SELECT OTHER POLICY COMPLIANT PROGRAM operation 312 with a next policy compliant program being selected for comparison. Otherwise, if a next policy compliant program is not to be selected for comparison ("NO"), from NEXT check operation 322, processing transitions to DEPLOY TARGET PROGRAM(S) TO TARGET operation 230 (FIG. 3D) as earlier described with reference to method 200 hereby incorporated by reference.

Referring now back again to USER CONFIRM check operation 318, alternatively, if the user input does not confirm the selection of the policy compliant program as a target program ("NO"), processing transitions from USER CONFIRM check operation 318, to a LOG operation 320.

In LOG operation 320, in one embodiment, the non-selection of the required policy compliant program as a target program is logged, such as to a text file, for later evaluation. From LOG operation 320, processing transitions to NEXT check operation 322 as earlier described.

Figure 3D:
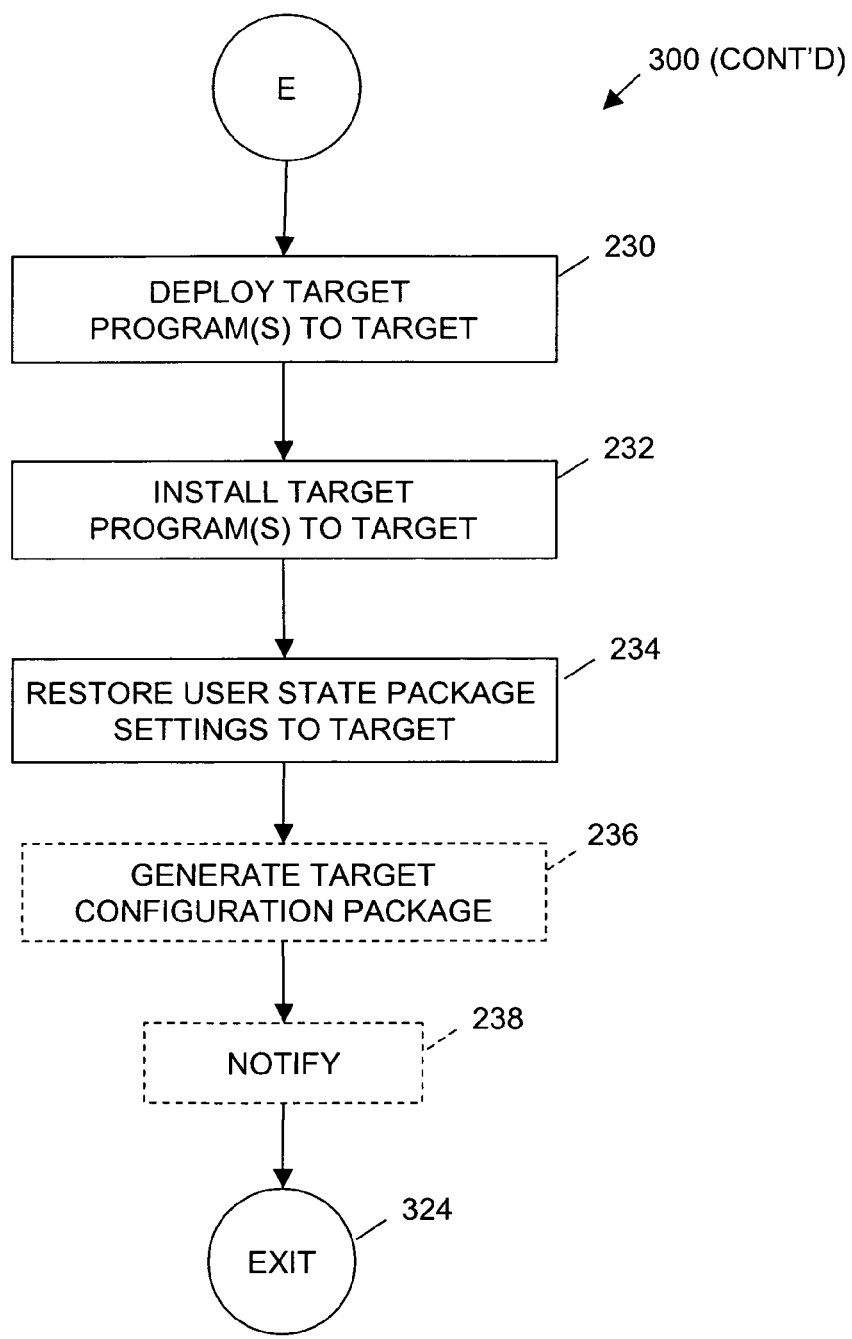

Referring now to DEPLOY TARGET PROGRAM(S) TO TARGET operation 230 and FIG. 3D, processing flows through the remaining operations as earlier described with reference to method 200 with processing exiting method 300 at an EXIT operation 324.

In some embodiments, users are provided an input option of canceling the operations of method 300 and exiting method 300, for example in operations 304 and 314, in which instances processing would transition directly to EXIT operation 324. In some embodiments, where a user does not select a policy compliant program or policy compliant program version, a user is provided an input option of installing the user state program and/or program version with the non-policy compliant selection being logged to a text file, such as for later evaluation.

Referring again to FIG. 1, although deployment application 138 is referred to as an application, this is illustrative only. Deployment application 138 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and Internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network, and signals transmitted over a network representing computer readable code.

In another example, a computer program product comprises a tangible medium configured to store computer readable code including CD-ROM discs, DVDs, ROM cards, floppy disks, magnetic tapes, computer hard drives, and servers on a network.

As illustrated in FIG. 1, this medium belongs to the computer system itself. However, the medium is also removable from the computer system. For example, deployment application 138 is stored in memory 136 that is physically located in a location different from processor 132, such as on a different computer system coupled to memory 136. This could be accomplished in a client-server system, or alternatively via a connection to another computer via modems and analog lines, or digital interfaces and a digital carrier line.

More specifically, in one embodiment, host computer system 130 is a portable computer, a workstation, a two-way pager, a cellular telephone, a digital wireless telephone, a personal digital assistant, a server computer, an Internet appliance, or any other device that includes components that execute deployment application 138 in accordance with at least one of the embodiments as described herein. Similarly, in another embodiment, host computer system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, deployment application 138 in accordance with one embodiment of the present invention can be implemented in a wide variety of computer system configurations. In addition, deployment application 138 could be stored as different modules in memories of different devices. For example, deployment application 138 could initially be stored in a different computer system, and as necessary, a portion of deployment application 138 could be transferred to host computer system 130 and executed on host computer system 130. Consequently, part of the functionality would be executed on processor 132 of host computer system 130, and another part would be executed on a processor of the different computer system. In view of this disclosure, those of skill in the art can implement various embodiments of the present invention in a wide variety of physical hardware configurations using an operating system and computer programming language of interest to the user.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-program product comprising a computer readable storage medium containing computer program code comprising:
   a deployment application for receiving a selection of a user state package, said user state package including at least one or more user state settings;
   said deployment application further for receiving a selection of a policy, said policy identifying one or more policy compliant programs;
   said deployment application further for receiving a selection of a target;
   said deployment application further for automatically determining one or more user state package programs based on said at least one or more user state settings;
   said deployment application further for automatically determining said one or more policy compliant programs, said policy compliant programs comprising required policy compliant programs that are required to be installed on said target;

said deployment application further for selecting one or more target programs for installation on said target from said one or more user state package programs comprising:

for each user state package program of said one or more user state package programs, determining whether said user state package program is one of said policy compliant programs, wherein upon a determination that said user state package program is one of said policy compliant programs, selecting said user state package program as one of said target programs; and said deployment application further for selecting said one or more target programs for installation on said target from said one or more required policy compliant programs comprising:

for each required policy compliant program of said required policy compliant programs, determining whether said required policy compliant program was selected as one of said target programs during said selecting one or more target programs for installation on said target from said one or more user state package programs, wherein upon a determination that said required policy compliant program was not selected, selecting said required policy compliant program as one of said target programs.

2. The computer-program product of claim 1 further comprising:
said deployment application further for automatically deploying said one or more target programs to said target.

3. The computer-program product of claim 2 further comprising:
said deployment application further for automatically installing said one or more target programs on said target.

4. The computer-program product of claim 1 further comprising:
said deployment application further for automatically restoring said user state settings to said target.

5. A computer implemented method performed upon execution of a deployment application by a processor comprising:
receiving a selection of a user state package, said user state package including at least one or more user state settings;
receiving a selection of a policy, said policy identifying one or more policy compliant programs;
receiving a selection of a target, said target identifying at least one or more computer systems;
automatically determining one or more user state package programs based on said at least one or more user state settings;
automatically determining each of said one or more policy compliant programs, said policy compliant programs comprising required policy compliant programs that are required to be installed on said target;
selecting one or more target programs for installation on said target from said one or more user state package programs comprising:
for each user state package program of said one or more user state package programs, determining whether said user state package program is one of said policy compliant programs, wherein upon a determination that said user state package program is one of said policy compliant programs, selecting said user state package program as one of said target programs; and selecting said one or more target programs for installation on said target from said one or more required policy compliant programs comprising:
for each required policy compliant program of said required policy compliant programs, determining whether said required policy compliant program was selected as one of said target programs during said selecting one or more target programs for installation on said target from said one or more user state package programs, wherein upon a determination that said required policy compliant program was not selected, selecting said required policy compliant program as one of said target programs.

6. The computer implemented method of claim 5 further comprising:
automatically deploying said one or more target programs to said target.

7. The computer implemented method of claim 6 further comprising:
automatically installing said one or more target programs on said target.

8. The computer implemented method of claim 5 wherein said selecting one or more target programs for installation on said target from said one or more user state package programs and said selecting said one or more target programs for installation on said target from said one or more required policy compliant programs are performed automatically.

9. The computer implemented method of claim 5 wherein said selecting one or more target programs for installation on said target is performed automatically upon receiving a user input confirming selection of said one or more target programs.

10. The computer implemented method of claim 5 further comprising:
automatically restoring said user state settings to said target.

11. The computer implemented method of claim 5 wherein said selecting one or more target programs for installation on said target from said one or more user state package programs further comprises:
upon a determination that said user state package program is one of said policy compliant programs, determining whether a user state package program version of said user state package program is a policy compliant program version of said policy compliant program.

12. The computer implemented method of claim 11 wherein upon a determination that said user state package program version of said user state package program is said policy compliant program version of said policy compliant program, said user state package program is selected as one of said target programs.

13. A computer system comprising:
a memory having stored therein a deployment application; and
a processor coupled to said memory, wherein execution of said deployment application generates a method comprising:
receiving a selection of a user state package, said user state package including at least one or more user state settings;
receiving a selection of a target, said target identifying at least one or more computer systems;
receiving a selection of a policy, said policy identifying one or more policy compliant programs;
automatically determining one or more user state package programs based on said at least one or more user state settings;

automatically determining each of said one or more policy compliant programs, said policy compliant programs comprising required policy compliant programs that are required to be installed on said target;

selecting one or more target programs for installation on said target from said one or more user state package programs comprising:

for each user state package program of said one or more user state package programs, determining whether said user state package program is one of said policy compliant programs, wherein upon a determination that said user state package program is one of said policy compliant programs, selecting said user state package program as one of said target programs; and selecting said one or more target programs for installation on said target from said one or more required policy compliant programs comprising:

for each required policy compliant program of said required policy compliant programs, determining whether said required policy compliant program was selected as one of said target programs during said selecting one or more target programs for installation on said target from said one or more user state package programs, wherein upon a determination that said required policy compliant program was not selected, selecting said required policy compliant program as one of said target programs.

14. The computer system of claim 13, the method further comprising:

automatically deploying said one or more target programs to said target.

15. The computer system of claim 13, the method further comprising:

automatically installing said one or more target programs on said target.

16. The computer system of claim 13 wherein said selecting one or more target programs for installation on said target from said one or more user state package programs and said selecting said one or more target programs for installation on said target from said one or more required policy compliant programs are performed automatically.

17. The computer system of claim 13 wherein said selecting one or more target programs for installation on said target is performed automatically upon receiving a user input confirming selection of said one or more target programs.

18. A computer implemented method performed upon execution of a deployment application by a processor comprising:

receiving a selection of a user state package, said user state package including user state settings;

receiving a selection of a policy, said policy identifying policy compliant programs;

receiving a selection of a target, said target identifying a computer system;

determining user state package programs based on said user state settings;

determining said policy compliant programs, said policy compliant programs comprising required policy compliant programs that are required to be installed on said target;

selecting target programs for installation on said target from said one or more user state package programs comprising:

for each user state package program of said user state package programs, determining whether said user state package program is one of said policy compliant programs, wherein upon a determination that said user state package program is one of said policy compliant programs, determining whether a user state package program version of said user state package program is a policy compliant program version of said policy compliant program, wherein upon a determination that said user state package program version of said user state package program is said policy compliant program version of said policy compliant program, selecting said user state package program as one of said target programs, and wherein upon a determination that said user state package program version of said user state package program is not said policy compliant program version of said policy compliant program, selecting said policy compliant program as one of said target programs.

19. The computer implemented method of claim 18 further comprising:

selecting said target programs for installation on said target from said required policy compliant programs comprising:

for each required policy compliant program of said required policy compliant programs, determining whether said required policy compliant program was selected as one of said target programs during said selecting target programs for installation on said target from said user state package programs, wherein upon a determination that said required policy compliant program was not selected, selecting said required policy compliant program as one of said target programs.

20. The computer implemented method of claim 19 wherein said selecting said user state package program as one of said target programs comprises logging said user state package program as a target program to a target program list, and wherein said selecting said required policy compliant program as one of said target programs comprises logging said required policy compliant program as a target program to said target program list.

* * * * *